(12) United States Patent
Mukai et al.

(10) Patent No.: US 8,420,703 B2
(45) Date of Patent: Apr. 16, 2013

(54) METHOD FOR SEPARATING AND REMOVING FOREIGN MATTERS FROM POLYESTER FIBER WASTE

(75) Inventors: Kouji Mukai, Matsuyama (JP); Minoru Nakashima, Matsuyama (JP)

(73) Assignee: Teijin Fibers Limited, Osaka (JP)

( * ) Notice: Subject to any disclaimer, the term of this patent is extended or adjusted under 35 U.S.C. 154(b) by 242 days.

(21) Appl. No.: 12/527,978

(22) PCT Filed: Feb. 19, 2008

(86) PCT No.: PCT/JP2008/053120
§ 371 (c)(1),
(2), (4) Date: Aug. 20, 2009

(87) PCT Pub. No.: WO2008/102896
PCT Pub. Date: Aug. 28, 2008

(65) Prior Publication Data
US 2010/0032618 A1 Feb. 11, 2010

(30) Foreign Application Priority Data
Feb. 23, 2007 (JP) ................ 2007-043669

(51) Int. Cl.
*C08J 11/04* (2006.01)

(52) U.S. Cl.
USPC ............ 521/48.5; 521/40; 521/48; 528/480; 528/495; 528/496; 528/502 R; 528/502 A; 422/129; 422/131; 422/134; 422/142; 422/147; 422/184.1; 422/232; 422/255; 422/292; 264/37.1; 526/67

(58) Field of Classification Search ............ 521/40, 521/40.5, 41, 46, 47, 48, 48.5, 49, 49.8; 422/129, 422/131, 134, 135, 137, 138, 139, 140, 142, 422/144, 145, 146, 147, 164, 184.1, 185, 422/232, 255, 292; 264/37.1; 526/67; 528/480, 528/481, 489, 495, 496, 502 A, 502 C, 502 D, 528/502 F, 503
See application file for complete search history.

(56) References Cited

U.S. PATENT DOCUMENTS

| 4,078,143 A | 3/1978 | Malik et al. |
| 7,173,150 B2 * | 2/2007 | Yazaki et al. ............. 562/483 |

(Continued)

FOREIGN PATENT DOCUMENTS

| EP | 1 227 075 A1 | 7/2002 |
| EP | 1 437 378 A1 | 7/2004 |

(Continued)

OTHER PUBLICATIONS

European Search Report dated Jul. 29, 2011 in corresponding European Application No. 08711884.

(Continued)

*Primary Examiner* — Frances Tischler
(74) *Attorney, Agent, or Firm* — Sughrue Mion, PLLC

(57) ABSTRACT

The purpose of the present invention is to provide a method for collecting effective components from polyester fiber waste containing polyalkylene telephthalate as the main component, more specifically to provide a method for separating and removing foreign matters (mainly cotton) contained in polyester fiber waste. The purpose of the invention can be achieved by a method for separating and removing foreign matters from polyester waste, which includes throwing polyester fiber waste that contains polyalkylene telephthalate as the main component and foreign matters other than the polyalkylene telephthalate into a depolymerization reaction tank, subjecting a part or all of the polyester fiber to a depolymerization reaction with alkylene glycol to give a depolymerization reaction liquid, and then continuously or intermittently feeding the liquid to a foreign matter-separating and removing apparatus having specified characteristics.

12 Claims, 1 Drawing Sheet

U.S. PATENT DOCUMENTS

2003/0225299 A1 12/2003 Yazaki et al.
2006/0074136 A1* 4/2006 Smith et al. .................... 521/48

FOREIGN PATENT DOCUMENTS

| JP | 62-029531 U | 2/1987 |
| JP | 01-065610 U | 4/1989 |
| JP | 2001-151709 A | 6/2001 |
| JP | 2003-128626 A | 5/2003 |
| JP | 2004-217871 A | 8/2004 |
| JP | 2004-277639 A | 10/2004 |
| JP | 2005-007780 A | 1/2005 |
| JP | 2005-330444 A | 12/2005 |
| WO | 2005-092963 A1 | 10/2005 |
| WO | 2006-080743 A1 | 8/2006 |

OTHER PUBLICATIONS

European Office Action dated Aug. 26, 2011 in corresponding European Application No. 08711884.

* cited by examiner

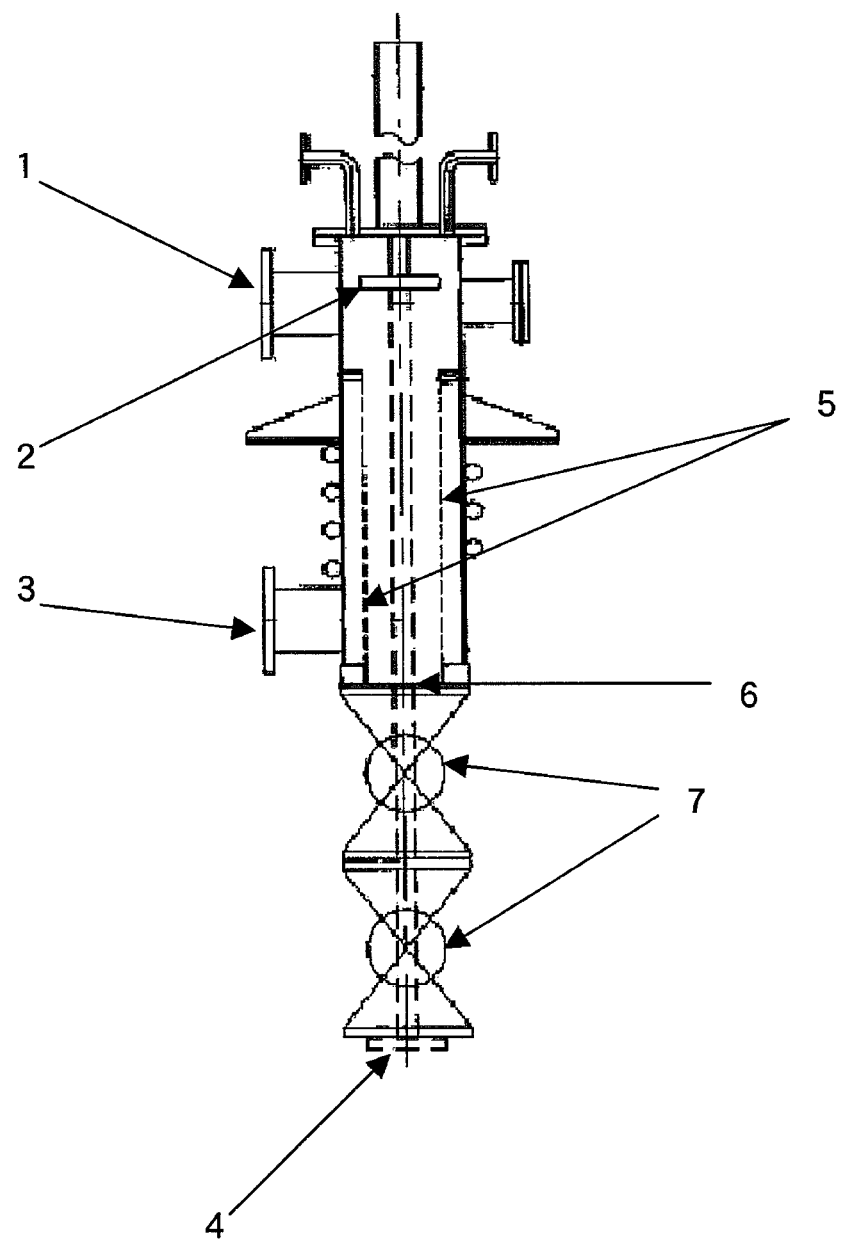

METHOD FOR SEPARATING AND REMOVING FOREIGN MATTERS FROM POLYESTER FIBER WASTE

TECHNICAL FIELD

The present invention relates to a method for collecting effective components from polyester fiber waste that contains polyalkylene telephthalate as the main component. More specifically, it relates to a method for effectively separating and removing foreign matters mainly composed of cotton contained in polyester fiber waste to avoid such troubles that cause the stop of facilities of a process.

BACKGROUND ART

Since polyethylene terephthalate has excellent chemical stability, the use thereof has rapidly increased in the field of life-related materials such as a fiber, film and resin, and foods such as a bottle for drinking water and carbonated beverage. However, the treatment of polyethylene terephthalate having been used and products with disqualified quality that are generated in a large amount along with the increase in the use amount as described above constitutes large social problems.

For the above problem, so-called chemical recycle is effective, in which polyester waste is converted to monomers, which are recovered to be used again as raw materials for polymerization reaction to produce and reuse polyethylene terephthalate. In the method, basically, the reuse loop of the compound with no loss is possible, and reutilization of resources becomes possible. That is, these kinds of collected polyester waste are subjected to depolymerization reaction with ethylene glycol, then to ester exchange with methanol, and the product is further separated and purified to be collected as dimethyl terephthalate and ethylene glycol. Consequently, the effective utilization of resources becomes possible, to result in lowering the cost when taking the step of the reutilization into consideration.

However, when treating polyester waste by the chemical recycle, in the case where polyester waste, in particular beverage bottles are selected as the object to be collected, the removal of foreign matters such as caps and labels is necessary. An example that refers to such a problem and takes measures thereto is shown (see Patent Document 1).

In addition, when fibers and the like from processes other than a polyester production process are selected as the object to be collected, there is such a case where the interfusion of polyester fibers containing dye can not be avoided. Dyes contained in these colored polyester fibers are thermally decomposed in a series of reactions such as depolymerization at high temperatures in the presence of a catalyst, which are then dispersed in components to be collected, to significantly degrade the quality of the component to be collected. An example that refers to such a problem and takes measures thereto is shown in Patent Document 2 below. But, although the inclusion of foreign matters other than polyester in the depolymerization reaction liquid prevents the transfer of the liquid to the subsequent process to cause process troubles, the document does not show any specific example on an effective method for separating and removing these foreign matters.

(Patent Document 1) JP-A-2004-277639
(Patent Document 2) JP-A-2004-217871

DISCLOSURE OF THE INVENTION

The purpose of the present invention relates to a method for collecting effective components from polyester fiber waste containing polyalkylene telephthalate as the main component, more specifically, it is to provide a method for effectively separating and removing foreign matters, which mainly contain cotton, contained in polyester fiber waste. In other words, the purpose is to provide a method for avoiding troubles caused by foreign matters to generate anything unusual in the process and to stop facilities. In addition, at the same time, the purpose is to provide a method for effectively collecting effective components to be the raw material for polyester, which are contained in polyester waste. Further other purposes and advantages of the invention will become clear from the description below.

With the view of the above technologies, the present inventors had intensively studied to complete the invention. That is, the invention is a method for separating and removing foreign matters from polyester waste, including throwing polyester fiber waste containing polyalkylene telephthalate as the main component and foreign matters other than the polyalkylene telephthalate into a depolymerization reaction tank, subjecting a part or all of the polyester fiber to a depolymerization reaction with an alkylene glycol to give a depolymerization reaction liquid, and then feeding continuously or intermittently the liquid to a foreign matter-separating and removing apparatus that has characteristics (a) to (f) below:

(a) the foreign matter-separating and removing apparatus has a filtering device, the device having a function of renewing the filtering surface;

(b) the foreign matter-separating and removing apparatus is arranged with a first foreign matter discharge port for discharging foreign matters at the bottom plane portion thereof, and further has a foreign matter discharge valve and a second foreign matter discharge port in the direction of discharging foreign matters from the first foreign matter discharge port that is arranged to the bottom plane portion of the foreign matter-separating and removing apparatus to the outside of the foreign matter-separating and removing apparatus;

(c) the bore of the second foreign matter discharge port is larger than or equal to the bore of the first foreign matter discharge port;

(d) the bore of the foreign matter discharge valve is larger than or equal to the bore of the first foreign matter discharge port;

(e) the bore of the second foreign matter discharge port is larger than or equal to the bore of the foreign matter discharge valve;

(f) the foreign matter-separating and removing apparatus has a compression apparatus for compressing foreign matters.

We found a method for separating and removing foreign matters contained in polyalkylene telephthalate using a foreign matter-separating and removing apparatus having these functions, and found that the above purpose can be achieved.

According to the method of the invention for separating and removing foreign matters, it is possible to effectively separating and removing foreign matters mainly containing cotton contained in polyester fiber waste when collecting effective components from polyester fiber waste containing polyalkylene telephthalate as the main component, thereby making it possible to avoid such troubles that force stopping facilities in the process. In addition, it is possible to effectively collect components to be raw materials of polyester.

BRIEF DESCRIPTION OF THE DRAWING

FIG. 1 is one example of a foreign matter-separating and removing apparatus for use in practicing the present invention.

EXPLANATION OF SYMBOLS

1: inlet of the depolymerization reaction liquid (depolymerization reaction liquid is composed mainly of BHET, alkylene glycol and foreign matters)
2: scraper
3: discharge port of filtrate (filtrate is mainly composed of BHET and alkylene glycol)
4: second foreign matter discharge port
5: filter
6: first foreign matter discharge port (at the bottom plane portion of the foreign matter-separating and removing apparatus)
7: foreign matter discharge valve

BEST MODE FOR CARRYING OUT THE INVENTION

Hereinafter, embodiments of the present invention will be described while using Examples and the like. These Examples and description are for exemplifying the invention, and not for limiting the scope of the invention. Other embodiments may also belong to the category of the invention, needless to say, as far as they correspond to the spirit of the invention.

In the method of the invention for separating and removing foreign matters, polyalkylene telephthalate fibers being the object have polyalkylene telephthalate as the main component. Typically, there can be exemplified fibers composed of polyethylene terephthalate, polytrimethylene terephthalate or polybutylene terephthalate, and other polyesters such as polyalkylene naphthalate, polyalkylene adipate, polyalkylene cyclohexanedicarboxylic acid or polylactic acid. Among these, polyethylene terephthalate is preferable. Additionally, raw materials other than polyester, such as nylon, cotton and hemp may be included as foreign matters in such a form as mix spinning, and other plastic components used for such a purpose as surface modification may be included. "Foreign matters" denote raw materials as described above other than polyester. Such foreign matters are preferably included in polyester fiber waste at the ratio of 30% by weight or less, because the separation and removal of foreign matters are relatively easy. The amount thereof over this range may make the clogging of the filtering material in a foreign matter-separating and removing apparatus as shown below significant, to degrade the operability thereof. "Including as the main component" denotes that a component is contained in an amount of 70% by weight or more in the total polyester fiber waste. The content is preferably 80% by weight, more preferably 90% by weight.

Hereinafter, a case, where the polyester fiber is mainly polyalkylene telephthalate fiber, will be described.

A polyalkylene telephthalate fiber for use in the invention may be one having been dyed. From the dyed polyester fiber, the dye may be extracted and removed, for example, by using a solvent in a dye-extracting process. After the end of the dye extraction, in a solid-liquid separation process, the extraction solvent containing the dye can be separated from the polyalkylene telephthalate fiber from which the dye has been extracted. Applicable methods for solid-liquid separation include publicly known solid-liquid separation methods such as pressurized filtration using a pressure filter or nitrogen gas, vacuum absorption filtration and centrifugation. Polyalkylene telephthalate fibers from which dyes have been extracted are thrown into a depolymerization reaction tank, which are allowed to react with alkylene glycol in the presence of a depolymerization catalyst in a depolymerization reaction process, to form a depolymerization reaction liquid including bis-ω-hydroxyalkyl terephthalate (BHAT). The temperature of this depolymerization reaction is preferably from 100 to 200° C., more preferably from 100 to 190° C. The weight ratio between polyalkylene telephthalate and alkylene glycol thrown into a depolymerization reaction tank is from 1.1 to 100 of alkylene glycol relative to 1 of polyalkylene telephthalate, preferably from 1.5 to 80, more preferably from 1.5 to 50. The depolymerization reaction liquid may be mixed with oligomer. Alkylene glycol to be used is preferably a glycol of at least one kind selected from a group consisting of ethylene glycol, diethylene glycol, 1,3-propanediol and 1,4-propanediol. As a depolymerization catalyst, compounds used for an ordinary ester exchange reaction or a hydrolysis reaction of ester compounds, such as alkali metal compounds, alkali earth metal compounds, manganese compounds and tin compounds may be used. The depolymerization reaction liquid of polyalkylene telephthalate thus obtained may be in a slurry form due to the existence of foreign matters.

A process of removing solid matters, which is the subsequent process, plays a role of feeding the depolymerization reaction liquid, which contains foreign matters mainly containing cotton, to the subsequent process with a pump after the depolymerization reaction. It is necessary to use a foreign matter-separating and removing apparatus having functions below, which is arranged on the way of piping for the liquid feed to the subsequent process:

(a) the foreign matter-separating and removing apparatus has a filtering device, the device having a function of renewing the filtering surface;

(b) the foreign matter-separating and removing apparatus is provided with a first foreign matter discharge port for discharging foreign matters at the bottom plane portion thereof, and further has a foreign matter discharge valve and a second foreign matter discharge port in the direction of discharging foreign matters from the first foreign matter discharge port that is arranged to the bottom plane portion of the foreign matter-separating and removing apparatus to the outside of the foreign matter-separating and removing apparatus;

(c) the bore of the second foreign matter discharge port is larger than or equal to the bore of the first foreign matter discharge port;

(d) the bore of the foreign matter discharge valve is larger than or equal to the bore of the first foreign matter discharge port;

(e) the bore of the second foreign matter discharge port is larger than or equal to the bore of the foreign matter discharge valve;

(f) the foreign matter-separating and removing apparatus has a compression apparatus for compressing foreign matters.

The liquid may be fed continuously or intermittently to the foreign matter-separating and removing apparatus. The liquid is preferably fed continuously because a large amount of the liquid can be fed stably per unit of time. In addition, intermittent feeding is also preferable for preventing the clogging of the filtering surface, and the like. Further, the depolymerization reaction liquid preferably has a temperature of from 100 to 200° C. when it is fed to the foreign matter-separating and removing apparatus. More preferably, the temperature is from 150 to 190° C. By keeping the temperature within this range, the slurry may be kept in a liquid state having an appropriate viscosity, which is preferable.

By supplying a liquid to the foreign matter-separating and removing apparatus having above-described functions, foreign matters are effectively separated and removed from the foreign matter-separating and removing apparatus to the outside thereof. A detailed separating and removing method will be described below.

The depolymerization reaction liquid containing foreign matters having been heated to from 100 to 200° C. in the depolymerization reaction tank is fed from a depolymerization reaction liquid inlet 1 arranged to the upper portion or side portion of the foreign matter-separating and removing apparatus. The material of a foreign matter-separating and removing apparatus main body may be iron or stainless steel, but the material of stainless steel having better corrosion resistance is preferable. From the depolymerization reaction liquid containing foreign matters fed to the foreign matter-separating and removing apparatus, foreign matters are caught by a filtering surface of a filter element constituted of a metallic mesh or a metallic punching plate. As the result, the depolymerization reaction alone is fed from an discharge portion 3 arranged to the lower or side portion of the foreign matter-separating and removing apparatus main body to the subsequent process. The pore diameter of the metallic mesh or punching plate used as a filter element may be in such a range with no problem that does not allow the foreign matter to leak, but it is preferably 100 µm or less.

It is preferably adopted that the clogging of the filtering surface of the foreign matter-separating and removing apparatus is detected from an increase in the pressure to a predetermined value or greater, which is shown by a pressure gauge provided to a supply inlet for the depolymerization reaction liquid in the foreign matter-separating and removing apparatus. On this occasion, when only one foreign matter-separating and removing apparatus is provided, the feed of the depolymerization reaction liquid is once stopped, but, when plural apparatuses are provided, it is possible to use these by switching over pipes for feeding the liquid. When the clogging of the foreign matter-separating and removing apparatus is detected and the transportation of the depolymerization reaction liquid is stopped, the filtering surface is automatically renewed by an apparatus having a function of renewing the filtering surface such as a scraper or a screw. When a large amount of foreign matters are accumulated to clog the filtering surface, it is further preferable to perform a one stage compression of foreign matters to squeeze the depolymerization reaction liquid impregnated in the foreign matter, and to perform the automatic renewal of the filtering surface. For a scraper, the one stage compression is possible by adjusting the working speed of a cylinder of an extrusion axis, and for a screw by controlling a motor current value.

After completing the one stage compression, preferably a cooling treatment of foreign matters is performed with low temperature alkylene glycol. Because the treatment is suitable for lowering the temperature of foreign matters having been heated to from 100 to 200° C. by the depolymerization reaction liquid and making the subsequent operation easy, and for collecting useful components to be polyester raw materials, which are contained in foreign matters after the one stage compression. After the cooling treatment, a compression treatment is performed again according to need, and the depolymerization reaction liquid compressed out of foreign matters is fed to the subsequent process by nitrogen blow. After the completion of feeding the depolymerization reaction liquid to the subsequent process by nitrogen blow, the foreign matter discharge valve provided to the bottom of the foreign matter-separating and removing apparatus main body is opened, and then foreign matters are extruded with a high pressure by a scraper or a screw to discharge the whole amount of foreign matters.

When the filtering surface has a tube-like form and an apparatus having a function of renewing the filtering surface is of a scraper type that works in the direction along the perpendicular axis relative to the bottom plane of the tube, the end portion of the scraper is set in the direction of one of bottom surfaces of the filtering surface. The scraper preferably has such a length that the end portion of the scraper reaches the portion where the second foreign matter discharge port is arranged, or greater. In the case where the scraper has such a length that does not allow the end portion thereof to reach the portion where the second foreign matter discharge port is arranged, not the whole amount of foreign matters are discharged, and some of foreign matters are nipped to the foreign matter discharge valve not to allow the discharge valve to shut sufficiently, thereby making the continuation of the subsequent operation impossible.

Even when no such compression function is provided, discharging foreign matters to the outside of the foreign matter-separating and removing apparatus is possible. But, foreign matters, which are in such a state that a large amount of the depolymerization reaction liquid being an effective component is contained, are discharged to the outside of the foreign matter-separating and removing apparatus, to decrease the collection amount of useful components to be the raw material of polyester. The useful component specifically means an aromatic dicarboxylic acid or lower diester thereof, or alkylene glycol to be the raw material in polyester production.

In addition, the bottom plane portion of the foreign matter-separating and removing apparatus may have a space for storing foreign matters. The existence of the space for the storage enables compressed foreign matters to be stored in the space. Thus, the period from once discharging foreign matters to the outside of the foreign matter-separating and removing apparatus from the bottom plane portion to discharging those next may be set in a longer time. As the result, as is clear in an Example described later, an effect of shortening the time necessary for making the depolymerization reaction liquid pass through the foreign matter-separating and removing apparatus can be expressed.

It is also necessary that a first foreign matter discharge port for discharging foreign matters is provided to the bottom plane portion of the foreign matter-separating and removing apparatus, and that a foreign matter discharge valve and a second foreign matter discharge port are further arranged in this order in the direction of discharging foreign matters from the first foreign matter discharge port at the bottom plane portion of the foreign matter-separating and removing apparatus. It is an indispensable condition that the bore of the second foreign matter discharge port that finally discharges foreign matters to the outside of the foreign matter-separating and removing apparatus is greater than or equal to the bore of the first foreign matter discharge port. When the bore of the second foreign matter discharge port is smaller than the bore of the first foreign matter discharge port, foreign matters clog at the second foreign matter discharge port and the discharge thereof to the outside of the foreign matter-separating and removing apparatus becomes impossible.

It is also an indispensable condition that the bore of the foreign matter discharge valve through which foreign matters pass when these are discharged from the foreign matter-separating and removing apparatus is greater than or equal to the bore of the first foreign matter discharge port. When the bore of the foreign matter discharge valve is smaller than the bore of the first foreign matter discharge port, foreign matters clog at the foreign matter discharge valve and the discharge thereof to the outside of the foreign matter-separating and removing apparatus becomes impossible.

Further, it is an indispensable condition that the bore of the second foreign matter discharge port that finally discharges foreign matters to the outside of the foreign matter-separating and removing apparatus is greater than or equal to the bore of the foreign matter discharge valve. When the bore of the second foreign matter discharge port is smaller than the bore of the foreign matter discharge valve, foreign matters clog at the second foreign matter discharge port and the discharge thereof to the outside of the foreign matter-separating and removing apparatus becomes impossible.

The first foreign matter discharge port arranged to the bottom plane portion of the foreign matter-separating and removing apparatus and the foreign matter discharge valve are desirably connected directly with each other, but a pipe may be connected between these. When a pipe is connected on the way, a pipe that has the same bore as that of the first foreign matter discharge port and no bend must be connected. If a pipe has a bore smaller than the bore of the first foreign matter discharge port and the bore of the foreign matter discharge valve, foreign matters clog inside the pipe, and the discharge thereof to the outside of the foreign matter-separating and removing apparatus becomes impossible. The foreign matter discharge valve preferably has a structure that does not prevent the discharge of foreign matters, such as a ball valve, a butterfly valve, a pinch valve, and a knife gate valve.

After completing the discharge of the whole amount of foreign matters, the scraper or screw is restored to the initial position, and then the foreign matter discharge valve is closed. When one foreign matter-separating and removing apparatus is used, feeding the depolymerization reaction liquid can be restarted, but, when plural apparatuses are set up, a waiting state continued until foreign matter-separating and removing apparatuses that are used while being switched have clogged.

According to the method of the invention for separating and removing foreign matters, when collecting effective components from polyester fiber waste that contains polyalkylene telephthalate as the main component, it is possible to effectively separating and removing foreign matters contained in polyester fiber waste, and to avoid troubles that force to stop facilities in the process. As the polyalkylene telephthalate, polyethylene terephthalate is preferable.

Hereinafter, while using a drawing of an apparatus that is suitable for practicing the method of the invention for separating and removing foreign matters, the removing method will be described specifically. FIG. 1 shows one example of a foreign matter-separating and removing apparatus suitable for practicing the method of the invention for separating and removing foreign matters. The apparatus is mainly provided with a depolymerization reaction liquid inlet 1, a scraper 2, a filter 5, a filtrate discharge port 3, a second foreign matter discharge port 4, a first foreign matter discharge port 6 (bottom plane portion of the foreign matter-separating and removing apparatus), and a foreign matter discharge valve 7.

The depolymerization reaction liquid containing foreign matters enters from the depolymerization reaction liquid inlet 1 to be thrown into a tubular foreign matter-separating and removing apparatus main body. At this time, the bottom plane portion 6 of the tubular foreign matter-separating and removing apparatus is blockaded and the first foreign matter discharge port is closed. The form of the tubular cross-section is not particularly limited, but a circular form which is easily designed and operated is preferable. To the side face of the foreign matter-separating and removing apparatus, a filter 5 having pores with an appropriate bore is provided. Through the pore of the filter 5, the liquid component among the constituents of the depolymerization reaction liquid is discharged from the filtrate discharge port 3 to the outside of the foreign matter-separating and removing apparatus. At the same time, foreign matters having a smaller size than the filter bore are also discharged from the filtrate discharge port 3 to the outside of the foreign matter-separating and removing apparatus. Further, when foreign matters accumulate in the direction from the bottom plane portion 6 to the upper portion of the foreign matter-separating and removing apparatus, the scraper 2 arranged to the upper portion of the foreign matter-separating and removing apparatus vertically comes down in the direction to the bottom plane portion 6, to compress foreign matters accumulating inside a space constituted of the bottom plane portion 6 of the foreign matter-separating and removing apparatus and the filter 5. On this occasion, the solid content, which adheres to the surface of the filter 5 and causes the filter clogging, is simultaneously removed from the surface of the filter 5 to renew the filtering surface. The liquid content having been pressed out is discharged from the filtrate discharge port 3 through the filter 5. Also from the standpoint of easy operation of removing the solid content adhering to the surface of the filter 5, the form of the cross-section formed by the filter portion (the form in the vertical direction relative to the paper surface of the attached drawing) is preferably circular.

Foreign materials after the compression treatment may directly be discharged from the bottom plane portion of the foreign matter discharge port after performing once such compression treatment, as described later. Or, the compression treatment may be repeated to accumulate foreign matters having been subjected to the compression treatment in a space constituted of the filter 5 and the bottom plane portion 6 in an appropriate amount to discharge the foreign matter.

When a large amount of foreign matters begin to accumulate in the space constituted of the bottom face and the filter irrespective of the repeated compression, the feed of depolymerization reaction liquid from the inlet 1 is once stopped, and a plate material constituting the bottom plane portion 6 of the foreign matter-separating and removing apparatus is opened downward. That is, the first foreign matter discharge port 6 is opened, foreign matters pass through the foreign matter discharge valve 7, and the foreign matter can be discharged through the second foreign matter discharge port 4 to the outside of the foreign matter-separating and removing apparatus. On the occasion of this operation, an aforementioned embodiment, in which the scraper reaches the portion where the second foreign matter discharge port is set up to discharge foreign matters, is also preferable. After discharging foreign matters, the plane material of the bottom plane portion 6 is returned to the original position of the foreign matter-separating and removing apparatus, the bottom plane portion 6 of the foreign matter-separating and removing apparatus is blockaded, and the first foreign matter discharge port is also closed. Next, the feed of the depolymerization reaction liquid having been stopped is started again, and the slurry of the depolymerization reaction liquid containing foreign matters is fed from the depolymerization reaction liquid inlet 1 to the inside of the apparatus.

Incidentally, after the end of these operations, ester exchange can be performed for the depolymerization reaction liquid with an ester exchange catalyst and methanol. In this process, components useful for polyalkylene telephthalate production, that is, crude dimethyl terephthalate and crude alkylene glycol can be obtained. Further, by purifying the crude dimethyl terephthalate and crude alkylene glycol obtained in the ester exchange by such a purifying method as distillation, purified dimethyl terephthalate and purified alkylene glycol having a high purity can be obtained. On this occasion, when a fiber composed of polyethylene terephthalate is used as a polyalkylene telephthalate fiber, purified dimethyl terephthalate and ethylene glycol can be obtained.

Example 1

A polyester fiber waste to be treated by the method of the present invention was a dyed polyethylene terephthalate fiber. That is, about $2.5 \times 10^3$ kg of polyethylene terephthalate fabric, which contained 30 wt % of foreign matters mainly composed of cotton and was dyed in black, was subjected to decoloring operation with a solvent, and then to depolymerization reaction in the presence of $10.5 \times 10^3$ kg of ethylene glycol and a depolymerization catalyst (sodium carbonate) at ordinary pressure and 185° C. for 4 hours. The obtained about $13.0 \times 10^3$ kg of depolymerization reaction liquid was fed to a foreign matter-separating and removing apparatus with a pump along with foreign matters contained in the depolymerization reaction liquid. The foreign matter-separating apparatus was an apparatus as shown in FIG. 1, which simultaneously had following functions (a) to (f) and a filtering device:

(a) the filtering device portion had a filtering surface-renewing function constituted of a metallic punching plate having a pore diameter of 20 μm and a scraper;

(b) the foreign matter-separating and removing apparatus was provided with a first foreign matter discharge port for discharging foreign matters at the bottom plane portion thereof, and further had a foreign matter discharge valve and a second foreign matter discharge port in the direction of discharging foreign matters from the first foreign matter discharge port that was arranged to the bottom plane portion of the foreign matter-separating and removing apparatus to the outside of the foreign matter-separating and removing apparatus, in the describe order;

(c) both the bore of a second foreign matter discharge port and the bore of the first foreign matter discharge port had the same size of 8 inches;

(d) both the bore of the foreign matter discharge valve and the bore of the first foreign matter discharge port had the same size of 8 inches;

(e) the bore of the foreign matter discharge valve and the bore of the second foreign matter discharge port had the same size of 8 inches; and (f) to the foreign matter-separating and removing apparatus, a compression apparatus, which compressed foreign matters with a scraper, was provided.

To the foreign matter-separating and removing apparatus simultaneously having the functions (a) to (f), feeding the aforementioned depolymerization reaction liquid was started with a pump at a rate of 300 L/min. Ten minutes after the start of feeding the depolymerization reaction liquid, a pressure gauge for measuring the pressure in a pipe, which was set at the feed inlet of the depolymerization reaction liquid of the foreign matter-separating and removing apparatus, showed an increase up to 0.5 MPa to detect the clogging of a tube of the foreign matter-separating and removing apparatus, therefore transporting the depolymerization reaction liquid was temporarily stopped.

Then, the renewal operation of the filtering surface and a one stage compression of the foreign matter were performed. The one stage compression of foreign matters was an operation that was also performed as the preparation of discharging the foreign matter. Specifically, since the end portion of the scraper had the same form and size as a cylindrical cross-sectional form formed by the filter, it was possible to press the depolymerization reaction liquid contained in the foreign matter and, at the same time, to perform an automatic renewal operation of the filtering surface by the one stage compression of the foreign matter. The one stage compression of the foreign matter was made possible by adjusting the working speed of the extrusion axis cylinder of the scraper.

After the completion of the one stage compression of the foreign matter, the foreign matter were subjected to cooling treatment with low temperature ethylene glycol. After the cooling treatment, the depolymerization reaction liquid that had been discharged by further compressing the foreign matter lump was fed to the subsequent process of the foreign matter-separating apparatus by nitrogen blow. After the completion of feeding the depolymerization reaction liquid to the subsequent process of the foreign matter-separating apparatus by the nitrogen blow, the first foreign matter discharge port at the bottom plane portion of the foreign matter-separating and removing apparatus main body was opened and the foreign matter discharge valve was opened, and then an extrusion operation of the foreign matter was performed by the scraper. Thus, the whole amount of the foreign matter was discharged from the second foreign matter discharge port to the outside of the foreign matter-separating and removing apparatus.

After the completion of discharging the whole amount of the foreign matter, the foreign matter discharge valve was closed and the scraper was returned to the initial position. Next, after closing the first foreign matter discharge port, the feed of the depolymerization reaction liquid into the foreign matter-separating and removing apparatus was restarted. By repeating a series of these operations, smooth removal of the foreign matter from the depolymerization reaction liquid became possible to make it possible to feed $13 \times 10^3$ kg of depolymerization reaction liquid to the subsequent process without opening and cleaning the foreign matter-separating and removing apparatus. The time necessary for the liquid feed was 1 hour.

Example 2

The same operation as in Example 1 was performed except for changing following points among the constitution of the foreign matter-separating and removing apparatus in Example 1:

(c) the bore of the second foreign matter discharge port was 10 inches, which was greater as compared with the bore of 8 inches of the first foreign matter discharge port;

(d) the bore of the foreign matter discharge valve was 10 inches, which was greater as compared with the bore of 8 inches of the first foreign matter discharge port; and (e) both the bore of the foreign matter discharge valve and the bore of the second foreign matter discharge port had the same size of 10 inches.

By repeating a series of operations same as those in Example 1, smooth removal of the foreign matter from the depolymerization reaction liquid became possible to make it possible to feed $13 \times 10^3$ kg of depolymerization reaction liquid to the subsequent process without opening and cleaning the foreign matter-separating and removing apparatus. The time necessary for the liquid feed was 1 hour as in Example 1.

Example 3

A depolymerization reaction liquid was obtained by the same operation as in Example 1, which was fed to a foreign matter-separating apparatus. As the foreign matter-separating and removing apparatus, the same foreign matter-separating apparatus as in Example 1 was used except for changing following points of the constitution:

(g) the length of the filter 5 portion in the vertical direction was longer than that of the foreign matter-separating and removing apparatus used in Example 1, to have a function of easily accumulating foreign matters in a space constituted of the bottom plane portion 6 of the foreign matter-separating and removing apparatus and the filter 5.

One step compression of the foreign matter by the scraper was practiced in the same way as in Example 1. By the one stage compression of the foreign matter, it was possible to squeeze the depolymerization reaction liquid contained in the foreign matter, and to automatically renew the filtering surface. In this Example, since the one stage compression enabled the foreign matter to be accumulated in the space constituted of the filter and bottom plane portion of the foreign matter-separating and removing apparatus, the subsequent filtration operation of the depolymerization reaction liquid was performed without discharging the foreign matter along with every one stage compression. As the result, practicing the separation and removal of the foreign matter, which was more effective in the necessary time as compared with in Example 1, became possible.

Specifically, in Example 1, the foreign matter was discharged to the out side of the foreign matter-separating apparatus every time when the clogging of the tube was checked, which was changed to about every 3 to 5 times. Also by continuously performing such operation, it was possible to repeat a series of operations same as in Example 1 and to smoothly remove the foreign matter from the depolymerization reaction liquid, and $13 \times 10^3$ kg of the depolymerization reaction liquid could be fed to the subsequent process without opening and cleaning the foreign matter-separating and removing apparatus. The necessary time for the liquid feed was 40 minutes, and thus it became possible to shorten in 20 minutes relative to 1 hour in Example 1.

Comparative Example 1

The depolymerization reaction liquid was obtained by the same operation as in Example 1. About $13.0 \times 10^3$ kg of the obtained depolymerization reaction liquid was fed to the subsequent process with a pump along with foreign matters contained in the depolymerization reaction liquid at a rate of 300 L/min.

When the foreign matter were filtrated and removed with a strainer provided with a cylindrical metallic 20 mesh size filter element not having a foreign matter-discharging function, filtering surface-renewing function or compressing function as a filtering surface, which was set on the way of liquid feed, the strainer was clogged with the foreign matter 10 minutes after starting the feed, thereby making the feed of the depolymerization reaction liquid impossible. For the clogged strainer, it was necessary to open the top cover, take out the metallic mesh and to clean the filtering surface after cooling. Until completely feeding the whole amount of about $13.0 \times 10^3$ kg of the depolymerization reaction liquid, the above-described cleaning was performed five times. As the result, the feed time of the depolymerization reaction liquid exceeded 3 hours.

Comparative Example 2

The depolymerization reaction liquid was obtained by the same operation as in Example 1. About $13.0 \times 10^3$ kg of the obtained depolymerization reaction liquid was fed to a foreign matter-separating and removing apparatus with a pump along with foreign matters contained in the depolymerization reaction liquid.

The foreign matter-separating and removing apparatus provided on the way of the liquid feed was a foreign matter-separating and removing apparatus having a filtering device simultaneously having functions as represented by (b) to (f) that were the same as in Example 1 except for the function (a) below:

(a) the filtering device portion was constituted of a metallic punching plate of 20 μm pore size and a scraper, wherein the scraper tip had the same form as a cross-section form of a cylinder formed by the filter, but had a smaller size than the cross-section, therefore there existed no filtering surface-renewing function.

To the foreign matter-separating and removing apparatus simultaneously having the above-described functions, feeding the aforementioned depolymerization reaction liquid was started with a pump at a rate of 300 L/min. Ten minutes after the start of feeding the depolymerization reaction liquid, a pressure gauge for measuring the pressure inside the tube provided to the depolymerization reaction liquid-feeding inlet of the foreign matter-separating and removing apparatus showed the increase up to 0.5 MPa to detect the clogging of a tube of the foreign matter-separating and removing apparatus. Then, the transportation of the depolymerization reaction liquid was temporarily stopped.

Next, without the renewal operation of the filtering surface, a one stage compression alone was performed in the same way as in Example 1, and operations following the compression were performed also in the same way as in Example 1. After the completion of discharging the whole amount of the foreign matter, the foreign matter discharge valve was closed and the scraper was returned to the initial position. Next, after closing the first foreign matter discharge port, the feed of the depolymerization reaction liquid into the apparatus was restarted. However, since a filtering surface renewing function was not provided, the foreign matter was left in a clogged state on the filtering surface. Thus, in a short time after restarting the feed of the depolymerization reaction liquid, the pressure of the foreign matter-separating and removing apparatus main body increased up to 0.5 MPa to indicate the clogging of the filtering surface. Finally, the foreign matter-separating and removing apparatus was opened to clean the filtering surface. As the result, more than 3 hours were necessary for feeding the whole amount of about $13 \times 10^3$ kg of the depolymerization reaction liquid to the subsequent process.

Comparative Example 3

The depolymerization reaction liquid was obtained by the same operation as in Example 1. About $13.0 \times 10^3$ kg of the obtained depolymerization reaction liquid was fed to the foreign matter-separating and removing apparatus with a pump along with foreign matters contained in the depolymerization reaction liquid.

The foreign matter-separating and removing apparatus provided on the way of the liquid feed was a foreign matter-separating and removing apparatus having a filtering device simultaneously having functions as represented by (a) to (e) that were the same as in Example 1 except for the function (f) below:

(f) a foreign matters compression function by a scraper was not provided.

To the foreign matter-separating and removing apparatus simultaneously having the above-described functions, feeding the aforementioned depolymerization reaction liquid was started with a pump at a rate of 300 L/min. Ten minutes after starting the feed of the depolymerization reaction liquid, a pressure gauge for measuring the pressure in the tube provided to the feed inlet of the depolymerization reaction liquid of the foreign matter-separating and removing apparatus showed the increase up to 0.5 MPa to detect the clogging of the tube of the foreign matter-separating and removing apparatus, and the transportation of the depolymerization reaction liquid was stopped temporarily.

However, since the foreign matter-separating and removing apparatus used in this Example did not have a compression function by a scraper, the foreign matter was extruded directly after opening the first foreign matter discharge port arranged to the bottom plane portion of the foreign matter-separating and removing apparatus main body, and the foreign matter discharge valve. As the result, discharging the foreign matter to the outside of the foreign matter-separating and removing apparatus was possible, but, the foreign matter was discharged in such a state that it contained a large amount of depolymerization reaction liquid being a useful component, to decrease the collection efficiency of polyester raw materials.

Comparative Example 4

The depolymerization reaction liquid was obtained by the same operation as in Example 1. About $13.0 \times 10^3$ kg of the obtained depolymerization reaction liquid was fed to the foreign matter-separating and removing apparatus with a pump along with foreign matters contained in the depolymerization reaction liquid.

The foreign matter-separating and removing apparatus provided on the way of the liquid feed was a foreign matter-separating and removing apparatus having a filtering device simultaneously having functions as represented by (a), (b), (d) and (f) that were the same as in Example 1 except for the functions (c) and (e) below:

(c) the bore of the second foreign matter discharge port was 5 inches, and the bore of the first foreign matter discharge port was 8 inches; and (e) the bore of the foreign matter discharge valve was 8 inches, and the bore of the second foreign matter discharge port was 5 inches.

To the foreign matter-separating and removing apparatus simultaneously having the above-mentioned functions, feeding the aforementioned depolymerization reaction liquid was started with a pump at a rate of 300 L/min. Ten minutes after the start of feeding the depolymerization reaction liquid, a pressure gauge for measuring the pressure in the tube, which was arranged to the feed inlet of the depolymerization reaction liquid of the foreign matter-separating and removing apparatus, showed an increase up to 0.5 MPa to detect the clogging of the tube of the foreign matter-separating and removing apparatus. Thus, the transportation of the depolymerization reaction liquid was temporarily stopped.

Next, the same operation was performed for renewing the filtering surface and one stage compression of the foreign matter as in Example 1, and then the depolymerization reaction liquid was fed to the subsequent process. Subsequently, an extrusion operation of the foreign matter was tried. Discharging the foreign matter to the outside of the foreign matter-separating and removing apparatus by a compression function was tried. However, since the bore of the second foreign matter discharge port of the foreign matter-separating and removing apparatus was smaller than the bore of the foreign matter discharge valve, the second foreign matter discharge port was clogged with the foreign matter, to make the discharge of the foreign matter impossible. Finally, the foreign matter-separating and removing apparatus was opened to clean the filtering surface. As the result, more than 3 hours were necessary for feeding the whole amount of about $13 \times 10^3$ kg of the depolymerization reaction liquid to the subsequent process.

Comparative Example 5

The depolymerization reaction liquid was obtained by the same operation as in Example 1. About $13.0 \times 10^3$ kg of the obtained depolymerization reaction liquid was fed to the foreign matter-separating and removing apparatus with a pump along with foreign matters contained in the depolymerization reaction liquid.

The foreign matter-separating and removing apparatus provided on the way of the liquid feed was a foreign matter-separating and removing apparatus having a filtering device simultaneously having functions as represented by (a) to (c) and (f) that were the same as in Example 1 except for functions (d) and (e) below:

(d) the bore of the foreign matter discharge valve was 5 inches, and the bore of the first foreign matter discharge port was 8 inches; and (e) the bore of the foreign matter discharge valve was 5 inches, and the bore of the second foreign matter discharge port was 8 inches.

To the foreign matter-separating and removing apparatus simultaneously having the above-mentioned functions, feeding the aforementioned depolymerization reaction liquid was started with a pump at a rate of 300 L/min. Ten minutes after the start of feeding the depolymerization reaction liquid, a pressure gauge for measuring the pressure in the tube, which was arranged to the feed inlet of the depolymerization reaction liquid of the foreign matter-separating and removing apparatus, showed an increase up to 0.5 MPa to detect the clogging of the tube of the foreign matter-separating and removing apparatus. Thus, the transportation of the depolymerization reaction liquid was temporarily stopped.

Next, the same operation was performed for renewing the filtering surface and one stage compression of the foreign matter as in Example 1, and then the depolymerization reaction liquid was fed to the subsequent process. Subsequently, an extrusion operation of the foreign matter was tried. Discharging the foreign matter to the outside of the foreign matter-separating and removing apparatus by a compression function was tried. However, since the bore of the foreign matter discharge valve of the foreign matter-separating and removing apparatus was smaller than the bore of the first foreign matter discharge port, the foreign matter discharge valve was clogged with the foreign matter, to make the discharge of the foreign matter impossible. Finally, the foreign matter-separating and removing apparatus was opened to clean the filtering surface. As the result, more than 3 hours were necessary for feeding the whole amount of about $13 \times 10^3$ kg of the depolymerization reaction liquid to the subsequent process.

Comparative Example 6

The depolymerization reaction liquid was obtained by the same operation as in Example 1. About $13.0 \times 10^3$ kg of the obtained depolymerization reaction liquid was fed to the foreign matter-separating and removing apparatus with a pump along with foreign matters contained in the depolymerization reaction liquid.

The foreign matter-separating and removing apparatus provided on the way of the liquid feed was a foreign matter-separating and removing apparatus having a filtering device simultaneously having functions as represented by (a), (b) and (f) that were the same as in Example 1 except for functions (c), (d) and (e) below:

(c) the bore of the second foreign matter discharge port was 5 inches, and the bore of the first foreign matter discharge port was 8 inches;

(d) the bore of the foreign matter discharge valve was 5 inches, and the bore of the first foreign matter discharge port was 8 inches; and (e) the bore of the foreign matter discharge valve was 5 inches, and the bore of the second foreign matter discharge port was 5 inches.

To the foreign matter-separating and removing apparatus simultaneously having the above-mentioned functions, feeding the aforementioned depolymerization reaction liquid was started with a pump at a rate of 300 L/min. Ten minutes after the start of feeding the depolymerization reaction liquid, a pressure gauge for measuring the pressure in the tube, which was arranged to the feed inlet of the depolymerization reaction liquid of the foreign matter-separating and removing apparatus, showed an increase up to 0.5 MPa to detect the clogging of the tube of the foreign matter-separating and removing apparatus. Thus, the transportation of the depolymerization reaction liquid was temporarily stopped.

Hereinafter, the same operation was performed for renewing the filtering surface and one stage compression of the foreign matter as in Example 1, and then the depolymerization reaction liquid was fed to the subsequent process. Subsequently, an extrusion operation of the foreign matter was tried. Discharging the foreign matter to the outside of the foreign matter-separating and removing apparatus by a compression function was tried. However, since the bore of the foreign matter discharge valve and the bore of the second foreign matter discharge port of the foreign matter-separating and removing apparatus were smaller than the bore of the first foreign matter discharge port, the foreign matter discharge valve was clogged with the foreign matter to make the discharge of the foreign matter impossible. Finally, the foreign matter-separating and removing apparatus was opened to clean the filtering surface. As the result, more than 3 hours were necessary for feeding the whole amount of about $13 \times 10^3$ kg of the depolymerization reaction liquid to the subsequent process.

INDUSTRIAL APPLICABILITY

According to the method of the present invention for separating and removing foreign matters, when collecting effective components from a polyester fiber waste containing polyalkylene telephthalate as the main component, it is possible to effectively collect foreign matters contained in the polyester fiber waste to avoid such troubles that cause the stop of facilities of a process.

The invention claimed is:

1. A method for separating and removing a foreign matter from polyester fiber waste, including throwing polyester fiber waste containing polyalkylene terephthalate as the main component and a foreign matter other than the polyalkylene terephthalate into a depolymerization reaction tank, subjecting a part or all of the polyester fiber to a depolymerization reaction with an alkylene glycol to give a depolymerization reaction liquid containing bis-ω-hydroxyalkyl terephthalate and alkylene glycol, and then feeding continuously or intermittently the depolymerization reaction liquid to a foreign matter-separating and removing apparatus that has characteristics (a) to (f) below:

(a) the foreign matter-separating and removing apparatus has a filtering device, the device having a function of renewing the filtering surface in the foreign matter-separating and removing apparatus;

(b) the foreign matter-separating and removing apparatus is arranged with a first foreign matter discharge port for discharging a foreign matter at the bottom plane portion thereof, and further has a foreign matter discharge valve and a second foreign matter discharge port in the direction of discharging a foreign matter from the first foreign matter discharge port that is arranged to the bottom plane portion of the foreign matter-separating and removing apparatus to the outside of the foreign matter-separating and removing apparatus;

(c) the bore of the second foreign matter discharge port is larger than or equal to the bore of the first foreign matter discharge port;

(d) the bore of the foreign matter discharge valve is larger than or equal to the bore of the first foreign matter discharge port;

(e) the bore of the second foreign matter discharge port is larger than or equal to the bore of the foreign matter discharge valve;

(f) the foreign matter-separating and removing apparatus has a compression apparatus for compressing a foreign matter to squeeze the depolymerization reaction liquid impregnated in the foreign matter, wherein the foreign matter contains nylon, cotton, hemp or other plastic component used for such a purpose as surface modification.

2. The method for separating and removing a foreign matter according to claim 1, wherein the foreign matter-separating and removing apparatus further has the characteristic of (g) below:

(g) the foreign matter-separating and removing apparatus has a space for accumulating the foreign matter in the bottom plane portion thereof.

3. The method for separating and removing a foreign matter according to claim 1, wherein the polyalkylene terephthalate is polyethylene terephthalate.

4. The method for separating and removing a foreign matter according to claim 1, wherein the alkylene glycol is a glycol of at least one kind selected from the group consisting of ethylene glycol, diethylene glycol, 1,3-propanediol and 1,4-butanediol.

5. The method for separating and removing a foreign matter according to claim 1, wherein the foreign matter other than polyalkylene terephthalate is contained in the polyester fiber waste at a ratio of 30% by weight or less.

6. The method for separating and removing a foreign matter according to claim 1, wherein the depolymerization reaction liquid is fed to the foreign matter-separating and removing apparatus at a temperature of from 100 to 200° C.

7. The method for separating and removing a foreign matter according to claim 2, wherein the depolymerization reaction liquid is fed to the foreign matter-separating and removing apparatus at a temperature of from 100 to 200° C.

8. The method for separating and removing a foreign matter according to claim 3, wherein the depolymerization reaction liquid is fed to the foreign matter-separating and removing apparatus at a temperature of from 100 to 200° C.

9. The method for separating and removing a foreign matter according to claim 4, wherein the depolymerization reaction liquid is fed to the foreign matter-separating and removing apparatus at a temperature of from 100 to 200° C.

10. The method for separating and removing a foreign matter according to claim 5, wherein the depolymerization reaction liquid is fed to the foreign matter-separating and removing apparatus at a temperature of from 100 to 200° C.

11. The method for separating and removing a foreign matter according to claim 1, wherein the filtering surface with the device having a function of renewing has a tube-like form.

12. The method for separating and removing a foreign matter according to claim 1, wherein the filtering device has a function of renewing the filtering surface with a metallic mesh or punching plate having a pore diameter of 100 μm or less and a scraper.

* * * * *